July 6, 1965  A. BURROWS  3,193,615
WATERPROOF CAP WITH INTEGRAL SEPARABLE O-RING
FOR ENGINE WIRING CONNECTION
Filed May 17, 1962

INVENTOR.
ALLEN BURROWS
BY
ATTORNEY

United States Patent Office
3,193,615
Patented July 6, 1965

3,193,615
WATERPROOF CAP WITH INTEGRAL SEPARABLE O-RING FOR ENGINE WIRING CONNECTION
Allen Burrows, Providence, R.I.
(38 James St., East Providence, R.I.)
Filed May 17, 1962, Ser. No. 195,615
3 Claims. (Cl. 174—138)

My present invention relates to the automotive art and more particularly to a waterproof cap for the electrical connections in an internal combustion engine.

The principal object of the present invention is to provide a cap for the distributor head and spark plug connections on an internal combustion engine.

Another object of the present invention is to provide a cap which fits tightly around the wiring and prevents moisture from creeping into the electrical connection.

A further object of the present invention is to provide a molded plastic or rubber cap in which an auxiliary part is molded with the main part and made part of it for shipping purposes.

A further object of the present invention is to provide a waterproofing cap which is simple in construction and easy and economical to manufacture and assemble.

With the above and other objects and advantageous features in view my invention consists of a novel arrangement of parts more fully disclosed in the detailed description following in conjunction with the accompanying drawings and more particularly defined in the appended claims.

In the modern automobile engine it is customary to provide waterproof rubber or plastic caps at some of the electrical connections to keep moisture away from the connection and prevent stalling. These points are the distributor head and the spark plugs. These caps are provided with central openings and the rubber covered electrical wires pass through these openings to the electrical connections, the cap covering the electrical connection. However, it has been found that moisture gathers on the outside of the rubber covered wire and has a tendency to slide or seep downwardly around the wire and into the rubber cap thus bypassing the rubber cap which loses its effectiveness. The present invention is designed to provide a rubber or plastic cap for the distributor head or spark plugs of an internal combustion engine so designed that the moisture cannot seep through the openings. The cap of the present invention is designed to tightly grip the electrical cord so that there will be no space for the moisture to seep into the cap.

Figure 2:
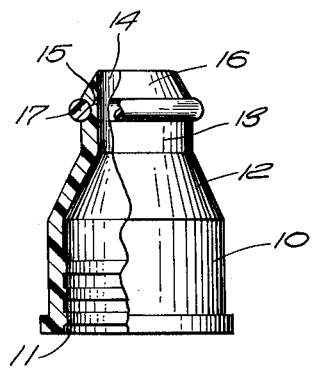
FIG. 2 is a side elevation partly in section of the cap shown in FIG. 1.

Referring more in detail to the drawings illustrating my invention, FIG. 2 illustrates a cap body 10 made of rubber or plastic or similar waterproof pliable dielectric material. The body portion may be provided interiorly with ribs 11 for gripping the distributor cap at the top end. The body portion tapers inwardly at 12 and terminates in a smaller annular portion 13 designed to surround the electrical cord (not shown) which enters through the opening 14. In accordance with the present invention the portion 13 is provided with an annular groove 15. The upper end of the portion 13 tapers inwardly at 16 towards the groove 15. An elastic O-ring 17 molded from the same material as the body portion 10 is forced over the tapered portion 16 unitl it snaps into the grooves 15 to constrict the portion 13 and squeeze it downwardly upon the wire which enters the opening 14. For this purpose the O-ring 17 is of slightly smaller diameter than the diameter of the groove 15 and is only snapped into position after the wire connection has been made.

Figure 1:
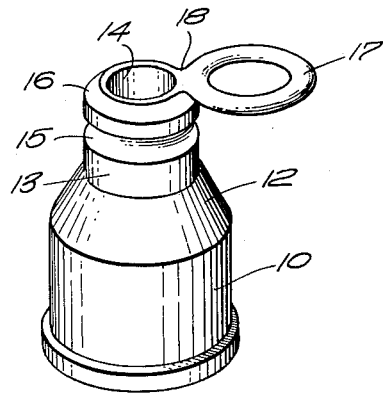
FIG. 1 is a perspective view of a waterproofing cap for a distributor connection.

Referring to FIG. 1, this figure illustrates the manner in which the cap shown in FIG. 2 is molded. It will be noted that the O-ring 17 is molded in a single piece to one side of the upper end of the cap body 10 with a small portion 18 attaching the O-ring to the upper edge of the body portion. This ensures that during handling, packaging, shipping, etc. the O-ring for the groove 15 will not be lost. When the mechanic desires to use the cap 10 he tears the O-ring 17 from the body portion by separating it at the point 18 which is actually a very thin membrane so that it will tear easily. If desired a large O-ring may be provided at the opposite end of the body portion 10 and a groove positioned therein for squeezing the lower end of the body portion around the distributor head.

Figure 3:
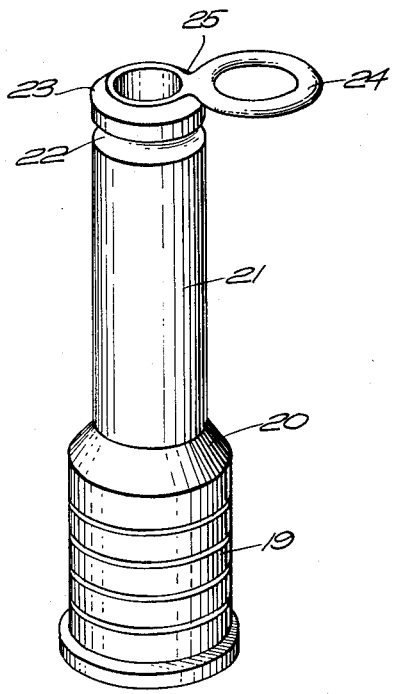
FIG. 3 is a perspective view of another form of cap designed to fit on a spark plug.
Figure 4:
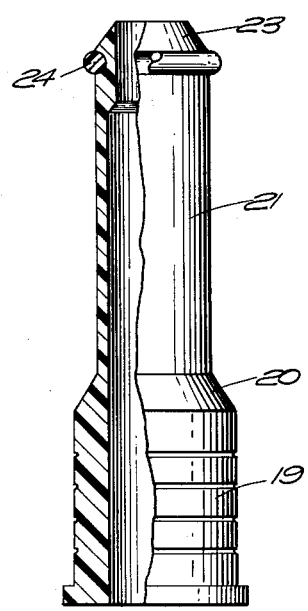
FIG. 4 is a side elevation partly in section of the cap shown in FIG. 3.

FIGS. 3 and 4 illustrate the same principle applied to the cap for the spark plug. The modern spark plug is usually fairly small and narrow. The cap illustrated in FIGS. 3 and 4 comprises a body portion 19 having a central tapered portion 20 which narrows the body portion to an elongated portion 21 at the upper end. The upper end of the portion 21 is provided with the groove 22 similar to the groove 15 and the tapered thrust end 23 which narrows the uper portion so that it will receive the O-ring 24. The O-ring 24 is molded to the upper edge of the portion 23 and is connected thereto by the membrane portion 25 shown in FIG. 3.

Similarly to the form shown in FIG. 2, the form shown in FIGS. 3 and 4 may also be provided with a groove and O-ring at the bottom end. Thus both forms may be provided with the constricted O-ring members at each end so that not only is the electrical cord gripped by the O-ring but the lower end may also be gripped around the particular object whether it is the distributor cap or the spark plug to prevent seepage of moisture from the bottom end. Also, the form shown in FIGS. 3 and 4 may be provided at the body portion 19 with internal ribs such as the ribs 11 shown in FIG. 2. Both forms may therefore be provided with the internal ribs 11 or may be made smoothly as shown in FIG. 4.

I have thus provided a waterproof cap for a distributor or spark plug which can be used as a replacement and which is equipped with an O-ring for positively forcing the end of the cap around the electrical wire to prevent moisture or dirt from seeping into the electrical connection. Furthermore, the O-ring is initially molded to the cap body so that it will not be lost in packaging and shipping. If the cap is made to fit the wire tightly for waterproofing, inserting the wire becomes difficult. The present invention permits the cap to be looser for easy insertion or assembly with the wire. The O-ring then tightens the cap to provide the weatherproofing.

Also, when the cap is made intially tight, it eventually becomes fatigued and loses some of its resiliency. This allows the moisture to enter. The present invention provides an O-ring which is made small enough so that even if its resiliency is lost it will still grip tightly. This is because it is at its elastic limit when in proper position. The beveled edge 16 is thus necessary to allow this undersized ring to be rolled into its groove.

Other advantages of the present invention will be readily apparent to a person skilled in the art.

I claim:

1. A waterproof cap for an electrical cord connection to an electrical fixture on an engine wherein the electrical cord passes through the cap to the electrical fixture, comprising a hollow body portion of waterproof, dielectric, resilient material, one end of said body portion being adapted to engage the electrical cord, said end having a groove adjacent the end, and an O-ring of resilient material adapted to be seated in said groove to constrict said end, the inside diameter of said O-ring being smaller than the diameter of said body portion at the bottom of said groove, said O-ring being molded integrally with said body portion and extending integrally from said grooved end, said integral connection comprising a thin web of separable material.

2. A waterproof cap for an electrical cord connection to an electrical fixture on an engine wherein the electrical cord passes through the cap to the electrical fixture, comprising a hollow body portion of waterproof, dielectric, resilient material, one end of said body portion being adapted to engage the electrical cord, said end having a groove adjacent the end, and an O-ring of resilient material adapted to be seated in said groove to constrict said end, the inside diameter of said O-ring being smaller than the diameter of said body portion at the bottom of said groove, said end being bevelled to form a taper between said groove and said end for sliding said O-ring into said groove, the other end of said body portion having internal ribs, said O-ring being molded integrally with said body portion and extending integrally from said grooved end, said integral connection comprising a thin web of separable material.

3. A waterproof cap for an electrical cord connection to an electrical fixture on an engine wherein the electrical cord passes through the cap to the electrical fixture, comprising a hollow body portion of waterproof, dielectric, resilient material, one end of said body portion being adapted to engage the electrical cord, said end having a groove adjacent the end, and an O-ring of resilient material adapted to be seated in said groove to constrict said end, the inside diameter of said O-ring being smaller than the diameter of said body portion at the bottom of said groove, said end being bevelled to form a taper between said groove and said end for sliding asid O-ring into said groove, the other end of said body portion having internal ribs, said O-ring being molded integrally with said body portion and extending integrally from said grooved end, said integral connection comprising a thin web of separable material, said hollow body portion being wider at one end and tapering to a narrower portion at the grooved end.

References Cited by the Examiner

UNITED STATES PATENTS

| | | | |
|---|---|---|---|
| 2,035,345 | 3/36 | Schaefer | 339—101 |
| 2,750,068 | 6/56 | Platt | 220—27 |
| 2,882,388 | 4/59 | Garland. | |
| 2,904,769 | 9/59 | Sampson et al. | 339—26 |
| 2,924,644 | 2/60 | Cox | 174—179 |
| 3,027,179 | 3/62 | Wiltse. | |

FOREIGN PATENTS

| | | |
|---|---|---|
| 146,131 | 4/52 | Australia. |
| 213,239 | 11/56 | Australia. |

LARAMIE E. ASKIN, *Primary Examiner.*

JOHN P. WILDMAN, E. JAMES SAX, *Examiners.*